(12) United States Patent  
Yamamoto (10) Patent No.: US 7,889,324 B2  
(45) Date of Patent: Feb. 15, 2011

(54) DISTANCE MEASURING SYSTEM AND PROJECTOR

(75) Inventor: Kyo Yamamoto, Higashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 119 days.

(21) Appl. No.: 12/340,860

(22) Filed: Dec. 22, 2008

(65) Prior Publication Data

US 2009/0161091 A1  Jun. 25, 2009

(30) Foreign Application Priority Data

Dec. 25, 2007 (JP) ............................ 2007-333329

(51) Int. Cl.
*G01C 3/08* (2006.01)
(52) U.S. Cl. .................. 356/4.01; 356/3.01; 356/3.1; 356/3.15; 356/4.1; 356/5.01
(58) Field of Classification Search ........ 356/3.01–28.5
See application file for complete search history.

(56) References Cited

U.S. PATENT DOCUMENTS

| | | | | |
|---|---|---|---|---|
| 2002/0186361 | A1* | 12/2002 | Ueno et al. | ................ 356/4.01 |
| 2005/0024625 | A1* | 2/2005 | Mori et al. | ................ 356/4.01 |
| 2006/0109450 | A1* | 5/2006 | Liu | ........................... 356/4.03 |
| 2007/0071431 | A1* | 3/2007 | Inoue et al. | ................ 396/116 |

FOREIGN PATENT DOCUMENTS

| JP | 3-065995 A | 6/1991 |
|---|---|---|
| JP | 2002-350543 A | 12/2002 |

OTHER PUBLICATIONS

Japanese Office Action dated Feb. 4, 2010 and English translation thereof in counterpart Japanese Application No. 2007-333329.

* cited by examiner

*Primary Examiner*—Thomas H Tarcza
*Assistant Examiner*—Luke D Ratcliffe
(74) *Attorney, Agent, or Firm*—Holtz, Holtz, Goodman & Chick, PC (57) ABSTRACT

A projector includes a light source unit, a light source-side optical system for guiding light from the light source unit to a display device, the display device, a projection-side optical system for projecting an image emitted from the display device on to a screen, and a distance measuring system 1 and has a projector control unit for controlling the light source unit and the display device. In addition, the distance measuring system 1 has a laser beam emitter 2 for emitting a laser beam to a distance measurement target object, a receiving lens 4 for concentrating reflected light from the distance measurement target object and a receiving element 3 for receiving the reflected light from the distance measurement target object which has passed through the receiving lens 4, and optical axes of the receiving lens 4 and the receiving element 3 are made to be aligned with an optical axis of the emitted laser beam.

10 Claims, 6 Drawing Sheets

DISTANCE MEASURING SYSTEM AND PROJECTOR

CROSS-REFERENCE TO RELATED APPLICATIONS

This application is based upon and claims the benefit of priority under 35 USC 119 of Japanese Patent Application No. 2007-333329 filed on Dec. 25, 2007, the entire disclosure of which, including the description, claims, drawings, and abstract, is incorporated herein by reference in its entirety.

BACKGROUND OF THE INVENTION

1. Field of the Invention

The present invention relates to a distance measuring system and a projector including the distance measuring system.

2. Description of the Related Art

In these days, projectors are used in many situations which project images displayed on a screen of a personal computer, images produced by video signals, and further images based on image data stored on a memory card on to a screen.

In many cases, projectors are constructed in such a manner that a small, high-intensity light source such as a metal halide lamp or an extra-high pressure mercury lamp is used, light emitted from the light source is passed through a color wheel composed of filters which divides the light into three primary colors of light, the resulting three primary colors of light is then shone on to a liquid crystal display device or a digital micromirror device (DMD) by a group of lens elements referred to as a light source-side optical system, and light that has been passed through or reflected by the display device is projected on to a screen via a group of lens elements referred to as a projection-side optical system which has a zooming function.

In projectors of this type, there occurs a case where a projected image is blurred or a trapezoidal distortion is produced in the projected image depending upon the distance from the projector to the screen, the inclination angle of the screen and the projection angle of image forming light, and in order to eliminate the occurrence of blurred images and/or trapezoidal distortions, the distance between the projector and the screen, the inclination angle of the screen and the projection angle of image forming light need to be measured accurately. To make this happen, a distance measuring system for measuring a distance between the projector and a plurality of points on the screen needs to be provided on the projector.

A distance measuring system for a general projector includes a light source, a receiving element and a receiving lens, wherein light is emitted to an object a distance to which is to be measured or a distance measurement target object, light reflected by the object is made to be concentrated on to the receiving element by the receiving lens, and the receiving element receives the light, from which a distance to the object is calculated by the receiving element. In a distance measuring system like this, much of the light reflected by the distance measurement target object needs to be incident on the receiving element, and a laser beam emitter, the receiving lens and the receiving elements are disposed substantially parallel in different positions. However, a direction in which a laser beam is emitted from the laser beam emitter and a direction in which the receiving elements receives the reflected light differ slightly with respect to their optical axes, and there is caused a position error as to where the reflected light is concentrated depending upon the distance to the distance measurement target object, leading to a problem that the distance measuring range is limited.

Then, to cope with this problem, for example, Japanese Unexamined Patent Publication No. 2002-350543 proposes, as a distance measuring system for a projector, a distance measuring system for measuring a distance to a distance measurement target object by projecting a laser beam emitted from a semiconductor laser device having a linear emitting part to the distance measurement target object via a sending lens system, receiving reflected light reflected by the distance measurement target object by a receiving element via a receiving lens system and processing an electrical signal generated by the receiving element, wherein the semiconductor laser device is provided in such a manner that a longitudinal direction of the linear emitting part of the semiconductor laser device becomes substantially parallel to a plane which connects an optical axis of the sending lens system with an optical axis of the receiving lens system, so as to cover a wide measuring range.

In this invention, since the linear emitting part is made to be included in the plane which connects the optical axis of the sending lens system with the optical axis of the receiving lens system, even though a receiving position error attributed to the deviation of the laser beam emitting direction from the reflected light receiving direction occurs in a near distance measurement, the reflected light only deviates in its longitudinal direction, and therefore, the receiving elements can obtain a sufficient amount of reflected light even in the near distance measurement, whereby the distance measuring system can be provided which has the wide distance measuring range from a far distance to a near distance.

SUMMARY OF THE INVENTION

According to a first preferred aspect of the invention, there is provided a distance measuring system having:

a laser beam emitter for emitting a laser beam to a distance measurement target object;

a concentrating element for concentrating reflected light from the distance measurement target object; and a receiving element for receiving the reflected light from the distance measurement target object via the light concentrating unit, wherein a receiving area of the concentrating element is positioned in an optical axis position of the laser beam emitted from the laser beam emitter.

In addition, according to a second preferred aspect of the invention, there is provided a projector comprising a light source unit, a light source-side optical system for guiding light from the light source unit to a display device, the display device, a projection-side optical system for projecting an image emitted from the display device on to a screen, and the distance measuring system according to the first preferred aspect of the invention, the projector having a projector control unit for controlling the light source unit and the display device, wherein the projector control unit comprises a distance calculating part for calculating distances to a plurality of points on the screen and calculating a mean distance, an inclination angle calculating part for calculating an inclination angle of the screen based on the distances to the plurality of points on the screen which have been calculated by the distance calculating part and a distortion correcting part for preparing image data for a projecting image which is corrected with respect to distortion based on the information calculated by the distance calculating part and the inclination angle calculating part.

Furthermore, according to a third preferred aspect of the invention, there is provided a projector comprising a light source unit, a light source-side optical system for guiding light from the light source unit to a display device, the display device, a projection-side optical system for projecting an image emitted from the display device on to a screen, and the distance measuring system according to the first preferred aspect of the invention, the distance measuring system having further a distance calculating part for calculating distances to a plurality of points on the screen, the projector having a projector control unit for controlling the light source unit and the display device, wherein the projector control unit comprises an inclination angle calculating part for calculating an inclination angle of the screen based on the distances to the plurality of points on the screen which have been calculated by the distance calculating part provided on the distance measuring system and a distortion correcting part for preparing image data for a projecting image which is corrected with respect to distortion based on the information calculated by the distance calculating part and the inclination angle calculating part.

BRIEF DESCRIPTION OF THE DRAWINGS

In addition.

DETAILED DESCRIPTION OF THE PREFERRED EMBODIMENTS

A projector 10 according to a best mode for carrying out the invention comprises a light source unit 62, a light source-side optical system for guiding light from the light source unit 62 to a display device 50, the display device 50, a projection-side optical system for projecting an image emitted from the display device 50 on to a screen, and a distance measuring system 1, and the projector 10 has further a projector control unit for controlling the light source unit 62 and the display device 50.

The distance measuring system 1 has a laser beam emitter 2 for shining a laser beam to an object a distance to which is to be measured or a distance measurement target object, a receiving lens 4 functioning as a concentrating device for concentrating reflected light from the distance measurement target object and a receiving element 3 for receiving the reflected light from the distance measurement target object which has passed through the receiving lens 4, and a light receiving area of the receiving lens 4 is positioned in an optical axis position of the laser beam emitted from the laser beam emitter 2. In addition, axes of the receiving lens 4 and the receiving element 3 are preferably made to be aligned with the optical axis of the laser beam emitted from the laser beam emitter 2.

Additionally, the distance measuring system 1 includes a concentrated light axis converting mirror 9 which is disposed on the optical axis of the receiving lens 4 for reflecting the reflected light from the distance measurement target object, and this concentrated light axis converting mirror 9 has an opening 15 which allows the emitted laser beam to pass therethrough.

In addition, in the opening 15, a shielding barrel 56 is provided which allows the emitted laser beam to pass therethrough.

Furthermore, an optical element 51 is disposed rotatably which refracts to change directions of the optical axes of the emitted laser beam, the receiving lens 4 and the receiving element 3.

In addition, the projector control unit includes a distance measuring part 45 for calculating distances to a plurality of points on the screen which constitutes the distance measurement target object and calculating a mean distance to the plurality of points, an inclination angle calculating part 46 for calculating an inclination angle of the screen based on the distances to the plurality of points on the screen which have been calculated by the distance calculating part 45, and a distortion correcting part 47 for preparing image data for a projecting image which is corrected with respect to distortion based on the information calculated by the distance calculating part 45 and the inclination angle calculating part 46.

Hereinafter, embodiments of the invention will be described based on the accompanying drawings.

Figure 1:
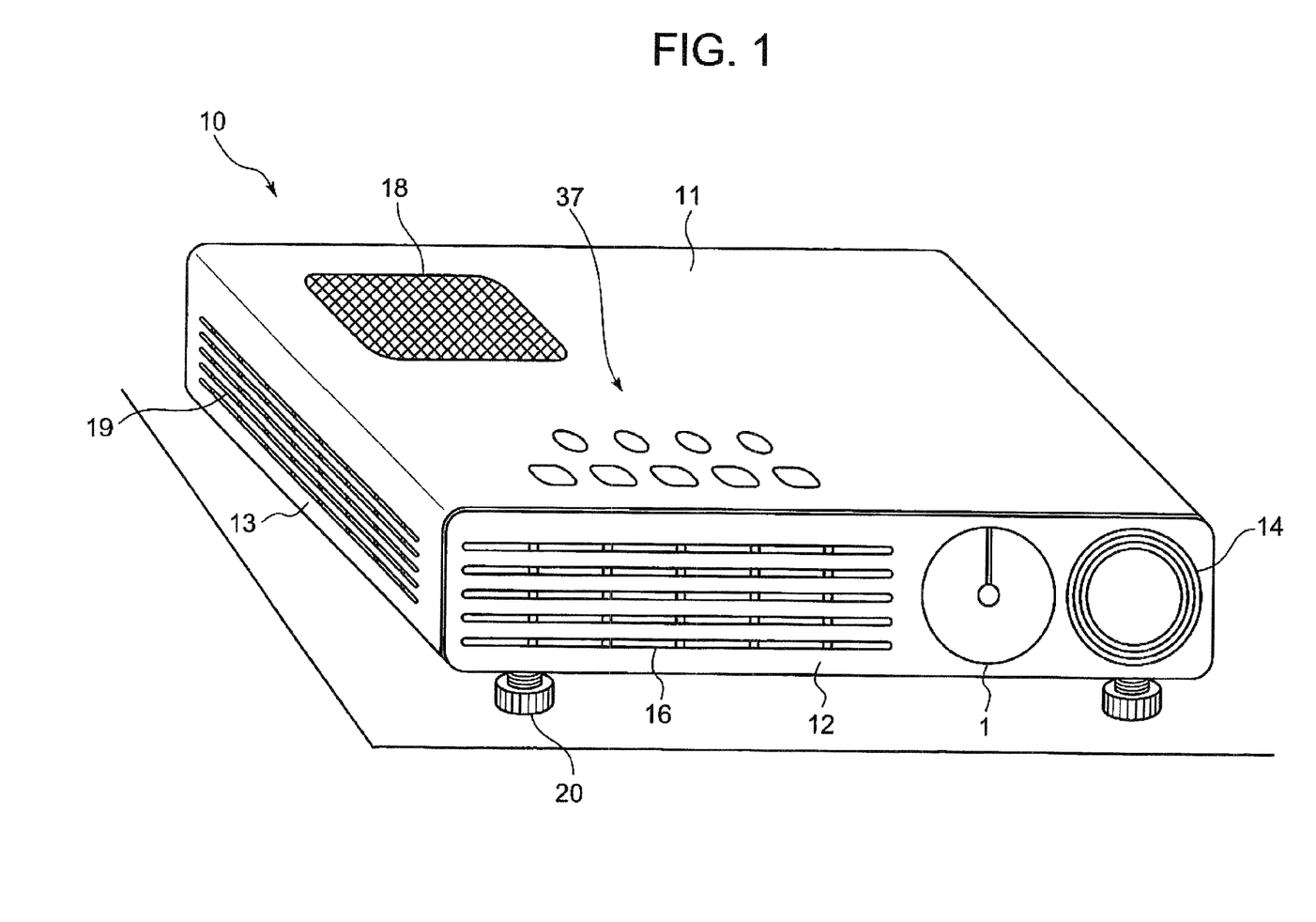
FIG. 1 is a schematic perspective view of a projector according to an embodiment of the invention.

As is shown in FIG. 1, a projector 10 according to an embodiment of the invention includes a projection opening 14 which is provided in a front panel 12 of a main body case in a position lying in the vicinity of one end of the front panel 12, and a distance measuring system 1 is disposed in the vicinity of the projection opening 14 so provided. In addition, a plurality of vent holes 16 are formed in the front panel 12 through which air that has cooled an interior of the projector 10 is discharged, and furthermore, although not shown, the projector 10 includes an Ir reception part for receiving a control signal from a remote controller.

In addition, a key/indicator part 37 and a sound output part 18 are provided on an upper panel 11 which constitutes part of the main body case. This key/indicator part 37 includes keys and indicators such as a power switch key, a power indicator which indicates that the power is on or off, a lamp switch key which turns on a lamp of a light source unit, a lamp indicator which indicates that the lamp is turned on, and an overheating indicator which indicates that the light source unit or the like is overheating.

Furthermore, although not shown, on a back side of the main body case, the projector 10 has an input/output connector part where USB connectors, image signal inputting D-SUB, S and RCA connectors and the like are provided, various types of connectors including a power supply adapter plug, and a memory card slot on a back panel.

In addition, the projector 10 has a plurality of air inlet holes 19 which are provided in each of a right-hand side panel 13 which constitutes a side panel of the main body case and a left-hand side panel, not shown, which also constitutes a side panel of the main body case. The projector 10 also has front legs 20 which are provided on a bottom panel which constitutes a bottom side of the main body case in such a manner as to be extended and contracted so as to adjust a projection angle, whereby the projector 10 is made to project images on to the screen in such a manner that the projector 10 is inclined obliquely upwards at the front thereof.

The projector 10 has in an interior thereof a power supply control circuit board which includes a lamp power supply circuit block and the like and a main circuit block which includes a projector control unit. The projector 10 also includes a cooling fan for reducing an interior temperature of the projector 10, a high-intensity light source including a halogen lamp or the like, a digital micromirror device (DMD) which functions as a display device for generating images, a light source-side optical system for concentrating light from the light source unit into the display device, a projection-side optical system for projecting emitted light from the DMD on to the screen, and a distance measuring system 1 for measuring a distance to the screen.

The DMD is made up of a plurality of micromirrors which are disposed in a matrix fashion, and light incident on the micromirrors from an incident direction which is inclined in one direction relative to a direction square to the front of the micromirrors is reflected to be divided into on-state light rays which are directed in the direction square to the front of the micromirrors and off-state light rays which are directed in an oblique direction by switching the inclination of the plurality of micromirrors between the "on" and "off" positions, where by an image to be projected is formed. Specifically, light incident on the micromirrors which are tilted in one inclined direction is reflected in the direction square to the front thereof by the micromirrors so tilted to produce on-state light rays, while light incident on the micromirrors which are tilted in the other inclined direction is reflected in the oblique direction by the micromirrors so tilted to produce off-state light rays, and the off-state light rays are made to be absorbed by a light absorber, whereby the light rays reflected in the direction square to the front of the micromirrors become bright to constitute image elements in the respective colors, while the light rays reflected in the oblique direction become dark to constitute dark or black image elements, so as to produce a full-color image.

Figure 2:
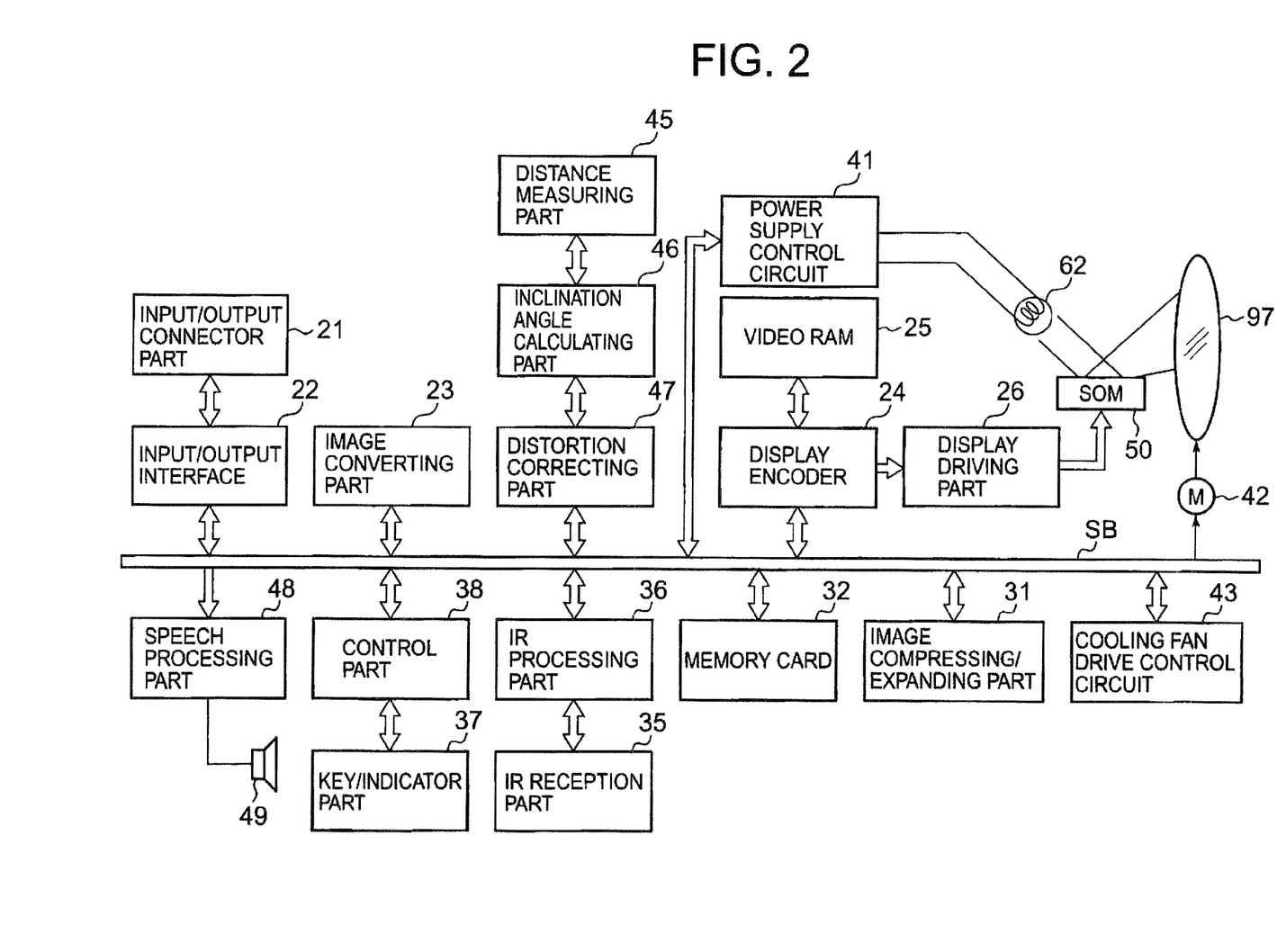
FIG. 2 is a block diagram of a functional circuit of the projector according to the embodiment of the invention.

In addition, as is shown in FIG. 2, the projector control unit of the projector 10 has a control part 38, an input/output interface 22, an image converting part 23, a display encoder 24, a display driving part 26 and the like. Image signals of various standards are inputted from an input/output connector part 21 and are then sent to the image converting part 23 via the input/output interface 22 and a system bus (SB), and in the image converting part 23, the image signals are converted to be united into a predetermined format which is suitable for display, whereafter the image signals so converted and united are sent to the display encoder 24.

The display encoder 24 deploys to store the image signal sent thereto in a video RAM 25 and generates a video signal from the contents stored in the video RAM 25 to send the video signal so generated to the display driving part 26.

The video signal is inputted into the display driving part 26 from the display encoder 24, and the display driving part 26 drives the display device 50 which is a spatial optical modulator (SOM) at an appropriate frame rate in association with the image signal sent thereto. Light from the light source unit 62 is incident on the display device 50 via the light source-side optical system, and an optical image is formed by reflected light from the display device 50, so that an image based on the optical image so formed is then projected to be displayed on a screen, not shown, via the projection-side optical system. A movable lens group 97 of the projection-side optical system is driven along an optical axis direction by a lens motor 42 to thereby adjust the magnification in zooming and to implement focusing of the image displayed on the screen.

An image compressing/expanding part 31 enables a recording process in which a luminance signal and a color-difference signal of the image signal are data compressed through a process such as ADTC and the Huffman coding so as to be sequentially written on a memory card 32 which is referred to as a detachable recording medium. When put in a reproduction mode, the image compressing/expanding part 31 reads out the image data recorded on the memory card 32 and expands individual image data which make up a series of moving images frame by frame to send expanded images to the display encoder 24 via the image converting part 23 so as to enable the display of moving images based on the image data stored on the memory card 32.

A distance calculating part 45 includes a calculating means for measuring distances to a plurality of points on the screen from electrical signals which are photoelectrically converted from reflected light which is reflected by the screen and received by a receiving element of the distance measuring system 1, which will be described later and, furthermore, calculating a mean distance to the screen. An inclination angle calculating part 46 calculates an inclination angle of the screen from the distances to the plurality of points on the screen which were calculated by the distance calculating part 45. Then, the distance calculating part 45 and the inclination angle calculating part 46 send data of the distances to the screen and the inclination angle of the screen which were calculated thereby to a distortion correcting part 47, and the mean distance to the screen calculated by the distance calculating part 45 is used when the lens motor 42 implements the focusing of an image formed on the screen.

The distortion correcting part 47 corrects a distorted projection image based on the data received from the distance calculating part 45 and the inclination angle calculating part 46 and sends an image signal resulting after the correction of distortion to the display encoder 24 via the image converting part 23 so as to enable the display of the projection image which has been corrected with respect to distortion.

The control part 38 governs the control of operations of the respective circuits within the projector 10 and is made up of a CPU, a ROM which stores fixedly operation programs of various settings and a RAM which is used as a working memory.

A control signal of the key/indicator part 37 which is made up of the main keys and indicators provided on the upper panel 11 of the main body case is sent out directly to the control part 38, and a key control signal from the remote controller is received by the Ir reception part 35, and a code signal which is demodulated at an Ir processing part 36 is sent to the control part 38.

In addition, a speech processing part 48 is connected to the control part 38 via the system bus (SB), and the speech processing part 48 includes a sound source circuit such as a PCM sound source. When in a projection mode and a reproduction mode, the speech processing part 48 converts voice data into analog signals and activates a speaker 49 to emit sound loudly.

In addition, the control part 38 includes a power supply control circuit 41, and this power supply control circuit 41 turns on a discharge lamp of the light source unit 62 when the lamp switch key is operated. Furthermore, the control part 38 controls a cooling fan drive control circuit 43 as well. This cooling fan drive circuit 43 controls a rotational speed of a cooling fan by allowing a plurality of temperature sensors provided on the light source unit and the like to detect temperatures thereat and allows the cooling fan to continue to rotate even after the lamp of the light source unit 62 is turned off by the use of a timer or the like. Furthermore, depending upon the results of temperature detections by the temperature sensors, the cooling fan drive control circuit 43 implements such a control to stop the operation of the light source unit 62 so as to switch off the power supply to a projector main body.

Next, the distance measuring system 1 disposed on the front panel 12 of the projector 10 will be described. The distance measuring system 1 will come in several forms according to embodiments of the invention.

Figure 3:
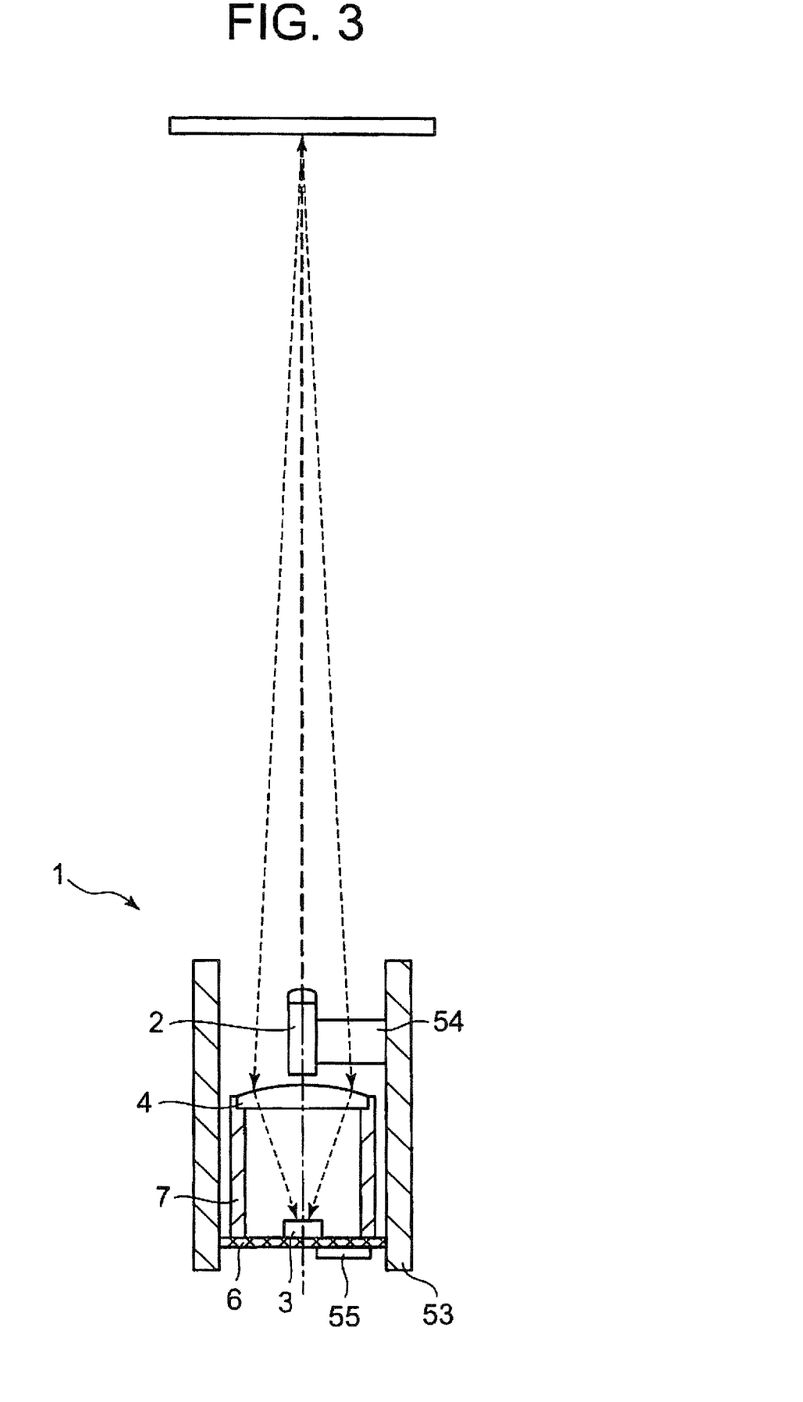
FIG. 3 is a schematic block diagram of a distance measuring system according to an embodiment of the invention in which a laser beam emitter is disposed on optical axes of a receiving lens and a receiving element.

According to an embodiment shown in FIG. 3, a distance measuring system 1 is an optical distance measuring system 1 which is made up of a laser beam emitter 2 for emitting a laser beam towards an object a distance to which is to be measured or a distance measurement target object such as a screen to measure a distance thereto, a receiving lens 4 for concentrating reflected light reflected from the distance measurement target object towards a receiving element 3, and the receiving element 3 for receiving the reflected light which has passed through the receiving lens 4.

Furthermore, the distance measuring system 1 includes a distance measuring substrate 6 in a center of which the receiving element 3 is disposed, a receiving barrel 7 which has a cylindrical shape which is made to open at both end faces and which is disposed in such a manner as to cover a circumferential edge of the receiving element 3, and a casing 53 which is disposed in such a manner as to cover the receiving barrel 7.

The receiving element 3 is fixed to the center of the distance measuring substrate 6, and the distance measuring substrate 6 has a laser beam emitter control element 55 for time-sharing control the laser emitter 2. In addition, the distance measuring part 45, which is, as has been described above, adapted to calculate the distances to the plurality of points on the screen from the electrical signal photoelectrically converted from the light received by the receiving element 3 and the mean distance to the screen, may be installed on this distance measuring substrate 6, instead of being installed on the projector control unit.

In addition, the laser beam emitter 2 emits a laser beam, which is a linear beam of light, towards the distance measurement target object and is time-sharing controlled at a determined frequency by the laser beam emitter control element 55.

The receiving element 3 is a high-sensitive receiving element 3 which amplifies a light signal by making use of an avalanche multiplication phenomenon caused to occur by an electronic avalanche breakdown such as an avalanche photodiode (APD) and is such as to be used as a receiving element 3 in a commercially available distance measuring system. The receiving element 3 receives a laser beam which is emitted from the laser emitter 2 and is then reflected by the distance measurement target object and converts the laser beam so received into an electrical signal. Then, by this electrical signal being sent to the distance calculating part 45, the distance calculating part 45 calculates a distance to the distance measurement target object from a difference in phase of the laser beam between when it was emitted and when it was received.

In addition, the receiving lens 4, which functions as a condensing lens, is a convex lens which concentrates the light reflected by the distance measurement target object towards the receiving element 3.

The receiving barrel 7 is formed into the cylindrical shape which is made to open at both the end faces and is made to prevent the incidence of unnecessary external light on the receiving element 3. The receiving element 3 is disposed at a central portion of one end of the receiving barrel 7, and the receiving lens 4 is disposed in such a manner as to close the other end of the receiving barrel 7. In addition, the receiving barrel 7 is disposed normal to the distance measuring substrate 6. In disposing the receiving barrel 7 in that way, the rear end of the receiving barrel 7 is fixed to the distance measuring substrate 6 to which the receiving element 3 is fixed in such a manner that an optical axis of the receiving element 3 is substantially aligned with an optical axis of the receiving lens 4.

The casing 53 is formed into a cylindrical shape which is made to open at the front and rear thereof. The casing 53 is disposed in such a manner as to cover the receiving barrel 7 and to allow the distance measuring substrate 6 to be fixed thereinside. In addition, a mounting member 54 for fixing the laser beam emitter 2 is provided inside the housing 53. In addition, the laser emitter 2 is disposed on the optical axis of the receiving lens 4 in a position lying forwards of the receiving lens 4 by the mounting member 54, or the laser emitter 2 is disposed in a light receiving area of the receiving lens 4 by the mounting member 54.

In addition, for the reflected light of the emitted laser beam to be concentrated into the receiving element 3 with good efficiency, the laser beam emitter 2 and the receiving lens 4 are preferably disposed in such a manner that the optical axis of the laser beam emitter 2 is aligned with the optical axis of the receiving lens 4 so that the optical axes of the receiving lens 4 and the receiving element 3 are aligned with the optical axis of the emitted laser beam.

According to the distance measuring system 1 of this embodiment which uses the laser beam emitter 2 as the light source, since the laser beam emitter 2 is disposed in such a manner that the light receiving area of the receiving lens 4 is positioned in the optical axis position of the laser beam emitted from the laser beam emitter 2, even though the distance to the distance measurement target object is changed, the reflected light can be concentrated into the center of the receiving element 3 with almost no change in the position where the reflected light from the distance measurement target object is concentrated, and hence, the adjustment of the mechanism is facilitated.

In the event that the laser beam emitter 2 is disposed on the optical axis of the receiving lens 4 in such a manner that the optical axes of the receiving lens 4 and the receiving element 3 are aligned with the optical axis of the emitted laser beam, since the position where the reflected light from the distance measurement target object is concentrated moves in no case even though the distance to the distance measurement target object is changed, the concentration of reflected light can be implemented with best efficiency.

In addition, since the distance measurement can be implemented accurately over a wide measuring range from far distance to near distance without using the compensating reflecting mirror, the compensating receiving lens or the receiving element having a specially shaped receiving plane which was used in the conventional light measuring system, the assembly and fabrication of the distance measuring system 1 is facilitated and an increase in production costs attributed to parts and assembly and fabrication of the distance measuring system 1 can be suppressed. Furthermore, the production costs of the projector 10 including the distance measuring system 1 can also be suppressed.

In addition, in the event that a plurality of distance measuring systems like the distance measuring system 1 are provided on the projector 10 and, furthermore, that the distance calculating part 45 and the inclination angle calculating part 46 are provided in the projector control unit, since respective distances to a plurality of points on the distance measurement target object, a mean distance to the distance measurement target object and an inclination of the distance measurement target object can be calculated accurately based on the data measured by the distance measuring systems 1, when a distortion correction is made by the distortion correcting part 47, an accurate correction can be implemented, thereby making it possible to provide the projector 10 which can project a beautiful full-color image. In addition, as has been described above, the distance calculating part 45 may be provided in the distance measuring system 1 so as to omit the distance measuring part 45 provided in the projector control unit.

Next, a distance measuring system 1 will be described in which an optical axis of an emitted laser beam is made to be aligned with optical axes of a receiving lens 4 and a receiving element 3 or an optical axis of an emitted laser beam is made to be positioned in a receiving area of a receiving lens 4 by the use of a reflecting mirror instead of a laser beam emitter 2 being disposed on the optical axis or in the receiving area of the receiving lens 4. Note that the reflecting mirror is preferably formed as small as possible while ensuring a sufficient size to reflect a laser beam emitted from the laser beam emitter 2.

In a distance measuring system 1 according to embodiments shown in FIG. 4, as has been described above, a laser beam emitter 2 is not disposed on optical axes of a receiving lens 4 and a receiving element 3 or in a receiving area of the receiving lens 4 but is fixed directly to an inside of a casing 53.

Figure 4A:
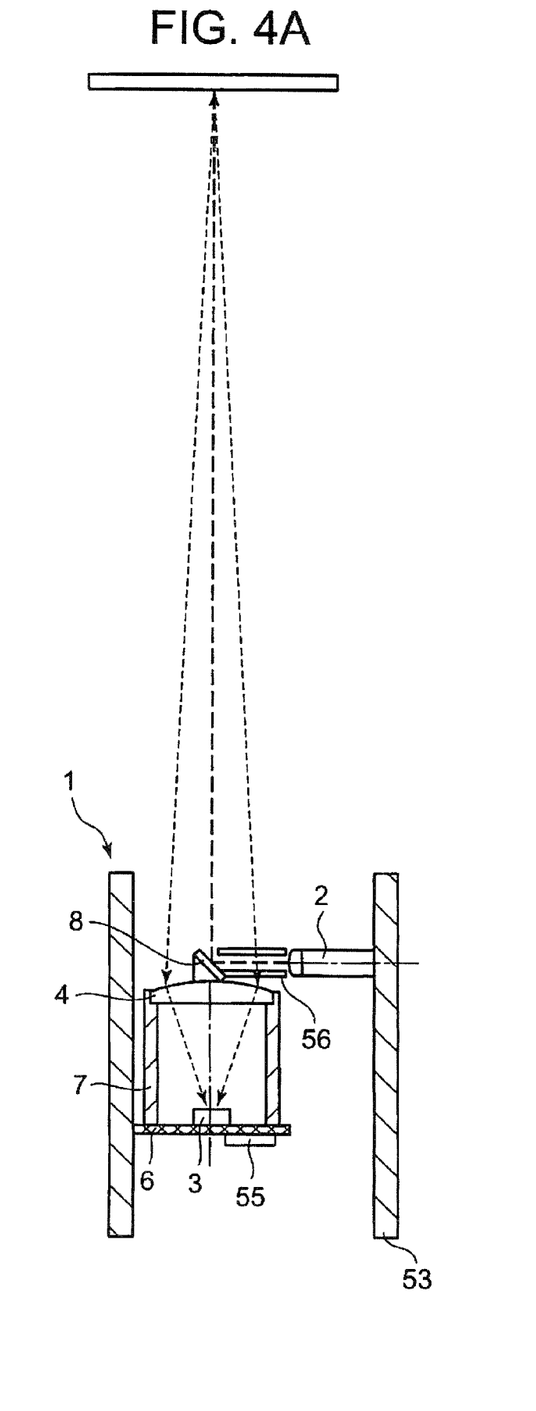
FIG. 4 shows schematic block diagrams of distance measuring systems according to another embodiment of the invention in which a reflecting mirror is disposed on optical axes of a receiving lens and a receiving element.

In an embodiment shown in FIG. 4A, a laser beam emitter 2 of a distance measuring system 1 is fixed to a housing 53 in such a manner that an optical axis of the laser beam emitter 2 intersects optical axes of a receiving lens 4 and a receiving element 3 at right angles in such a state that an emitting opening of the laser beam emitter 2 is oriented towards the optical axes of the receiving lens 4 and the receiving element 3. In addition, a reflecting mirror 8 is fixed to the receiving lens 4 in such a manner as to be disposed in a position on the optical axis or in a position making up a receiving area of the receiving lens 4 which lies forwards of the receiving lens 4 and the receiving element 3 and is disposed to form an inclination angle of 45 degrees relative to the optical axes of the receiving lens 4 and the receiving element 3 to thereby function as a reflecting mirror 8 which can reflect a laser beam emitted from the laser beam emitter 2 at right angles towards a distance measurement object.

By this configuration, when a laser beam emitted from the laser beam emitter 2 is reflected towards the distance measurement object by the reflecting mirror 8 and reflected light from the distance measuring object passes through the receiving lens 4 to be concentrated into the receiving element 3, the optical axis of the emitted laser beam which is directed in a direction at right angles to its original optical axis direction by the reflecting mirror 8 comes to be positioned within the receiving area of the receiving lens 4, and furthermore, the optical axis of the emitted laser beam which is directed in the direction at right angles to its original optical axis direction by the reflecting mirror 8 can be made to be aligned with the optical axes of the receiving lens 4 and the receiving element 3.

Figure 4B:
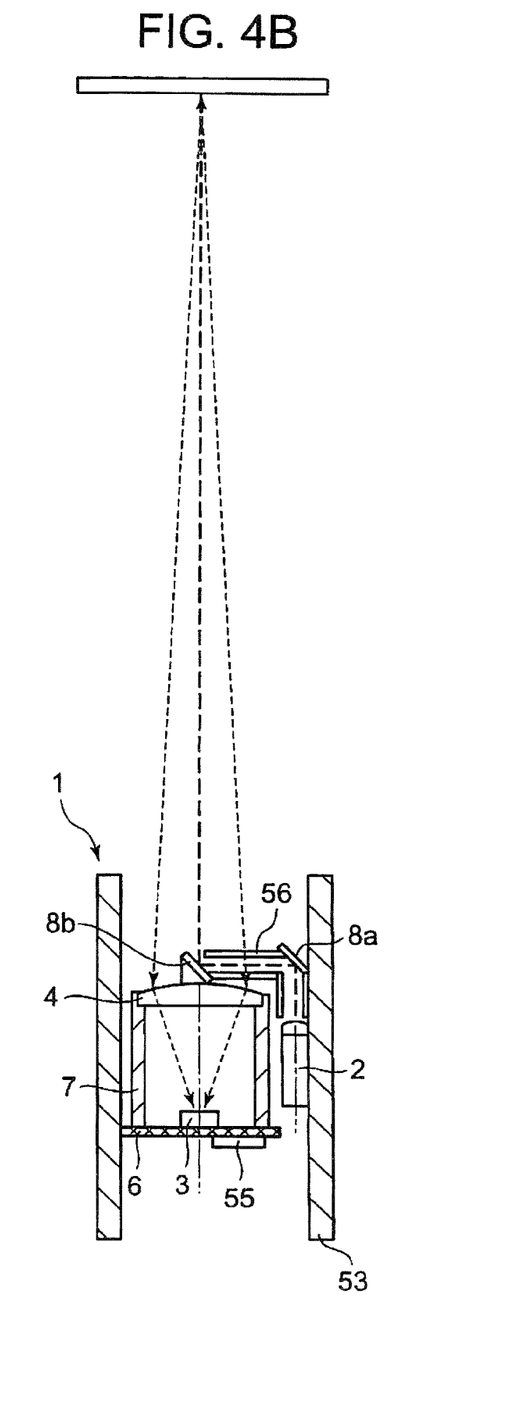

In addition, a distance measuring system 1 according to an embodiment shown FIG. 4B includes, as mirrors for reflecting a laser beam emitted from a laser beam emitter 2, a first reflecting mirror 8a for reflecting first the laser beam and a second reflecting mirror 8b for the laser beam reflected by the first reflecting mirror 8a towards a distance measurement target object. In addition, in this distance measuring system 1, the laser beam emitter 2 is disposed in such a manner that an optical axis of the laser beam emitter 2 becomes parallel to an optical axis of a receiving lens 4, the first reflecting mirror 8a is fixed to an inside of a casing 53 in such a manner as to form an inclination angle of 45 degrees relative to the optical axis of the laser beam emitter 2 on the optical axis of the laser beam emitter 2, and the second reflecting mirror 8b is fixed to the receiving lens 4 in such a manner as to form an inclination angle of 45 degrees relative to the optical axis of the receiving lens 4 in a position on the optical axis or in a receiving area of the receiving lens 4 lying forwards of the receiving lens 4 and the receiving element 3.

By this configuration, when a laser beam emitted from the laser beam emitter 2 is shone to the distance measurement target object via the first and second reflecting mirrors 8a, 8b and reflected light from the distance measurement target object passes through the receiving lens 4 to be concentrated into the receiving element 3, an optical axis of the emitted laser beam can be positioned within the receiving area of the receiving lens 4 by the first and second reflecting mirrors 8a, 8b, or the optical axis of the emitted laser beam can be made to be aligned with the optical axes of the receiving lens 4 and the receiving element 3.

In this way, by providing the reflecting mirror 8 in the distance measuring system 1, since the optical axis of the emitted laser beam can be positioned within the receiving area of the receiving lens 4 or the optical axis of the emitted laser beam can be made to be aligned with the optical axis of the receiving lens 4 and the receiving element 3, the same advantage as that described above can be provided.

Furthermore, since the reflecting mirror 8, which is smaller than the laser beam emitter 2, is installed on the optical axes of the receiving lens 4 and the receiving element 3 or in the receiving area of the receiving lens 4 in place of the laser beam emitter 2 and further, no mounting member 54 is provided in the casing 53, an area where the incidence of reflected light on the receiving lens 4 is interrupted can be made small, and hence, the reception of reflected light from the distance measurement target object by the receiving element 3 can be ensured. In addition, since the laser beam is shone towards the distance measurement target object via the reflecting mirror 8, the degree of freedom in arranging the constituent components is increased, thereby making it possible to make the projector 10 smaller in size.

In addition, in order to prevent the scattering of a laser beam emitted from the laser beam emitter 2, a cylindrical shielding barrel 56 which allows the emitted laser beam to pass therethrough from the laser beam emitter 2 to the reflecting mirror 8 or the second reflecting mirror 8b is preferably installed in the casing 53 in such a manner as, for example, to be fixed thereto. By this configuration, scattering light of the laser beam can be prevented from being incident directly on the receiving element 3 via the receiving lens 4.

In addition, a distance measuring system 1 may be provided in which a concentrated light optical axis converting mirror for reflecting reflected light from a distance measurement target object is disposed on optical axes of a receiving lens 4 and a receiving element 3 or in a receiving area of the receiving lens 4, whereby the optical axes of the receiving lens 4 and the receiving element 3 are aligned with an optical axis of an emitted laser beam or the receiving area of the receiving lens 4 is positioned in an optical axis position of the emitted laser beam. Note that the mirror is preferably formed to have a sufficient size to ensure the incidence of a sufficient or required amount of reflected light which has been emitted from a laser beam emitter 2 and reflected by the distance measurement target object on the receiving lens 4 and hence the receiving element 3.

As this occurs, as is shown in FIG. 5, a laser beam emitter 2 is fixed to an inside of a casing 53 by a mounting member 54 in such a manner that an emitting opening of the laser beam emitter 2 is directed towards a distance measurement object so that a laser beam emitted from the laser beam emitter 2 is shone directly to the distance measurement object without involvement of any reflecting mirror.

Figure 5A:
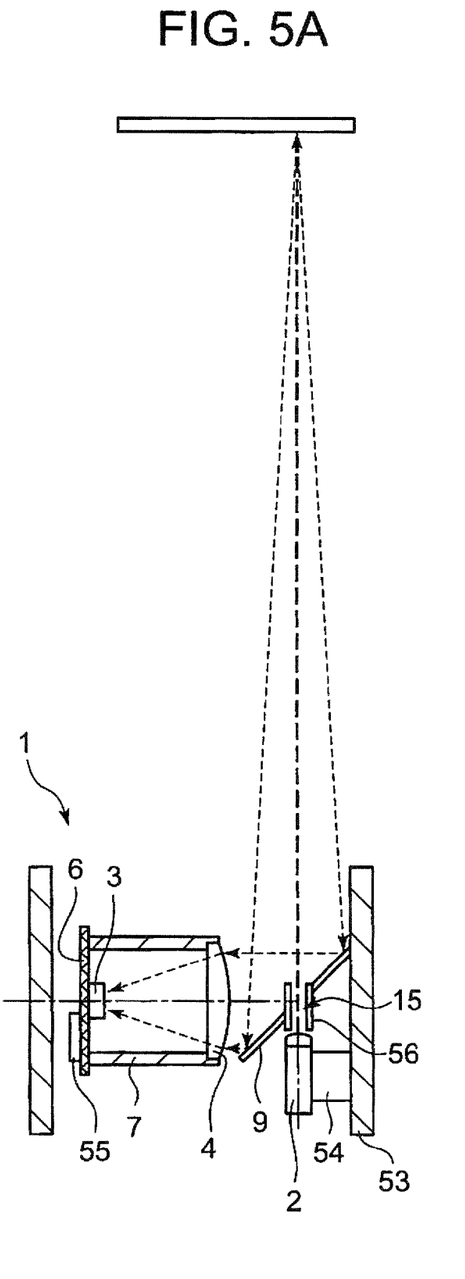
FIG. 5 shows schematic block diagrams of distance measuring systems according to a further embodiment of the invention in which a concentrated light optical axis converting mirror having an opening provided therein is disposed on an optical axis of a laser beam emitter.

In a distance measuring system 1 according to an embodiment shown in FIG. 5A, a distance measuring substrate 6 is fixed in place inside a casing 53 in such a manner that optical axes of a receiving lens 4 and a receiving element 3 intersect an optical axis of a laser beam emitter 2 at right angles. In addition, a concentrated light optical axis converting mirror 9 is a disc-shaped mirror having an opening 15 in a center thereof. The concentrated light optical axis converting mirror 9 is fixed to the casing 53 while being positioned on the optical axis or in a receiving area of the receiving lens 4 in such a manner that the opening 15 is positioned on the optical axis of the laser beam emitter 2 in a position lying forwards of the laser beam emitter 2 and in such a manner as to form an inclination angle of 45 degrees relative to the optical axes of the receiving lens 4 and the receiving element 3 so as to convert the optical axes of the receiving lens 4 and the receiving element 3 in a direction which is at right angles thereto.

By this configuration, when a laser beam emitted from the laser beam emitter 2 is shone to a distance measurement target object by passing through the opening 15 in the concentrated light optical axis converting mirror 9 and reflected light from the distance measurement target object is guided to the receiving lens 4 via the concentrated light optical axis converting mirror 9, since the optical axes of the receiving lens 4 and the receiving element 3 are converted in the direction at right angles thereto by the concentrated light optical axis converting mirror 9, the optical axis of the receiving lens 4 is aligned with the optical axis of the emitted laser beam, or the receiving area of the receiving lens 4 is positioned in the optical axis position of the emitted laser beam.

Figure 5B:
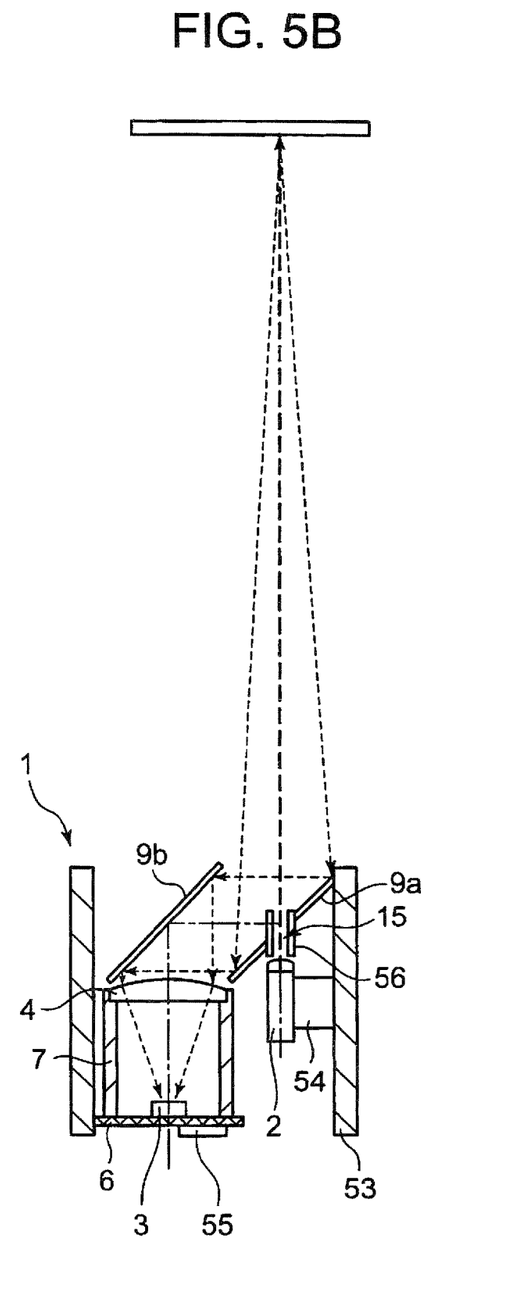

In addition, in a distance measuring system 1 according to an embodiment shown in FIG. 5B, a distance measuring substrate 6 is fixed in place inside a casing 53 in such a manner that optical axes of a receiving lens 4 and a receiving element 3 become parallel to an optical axis of a laser beam emitter 2. In addition, in this distance measuring system 1, a second concentrated light optical axis converting mirror 9b, which is a mirror having no opening 15, is fixed to the casing 53 or the like in such a manner as to form an inclination angle of 45 degrees relative to the optical axes of the receiving lens 4 and the receiving element 3 in a position on the optical axis or in a receiving area of the receiving lens 4 which lies forwards of the receiving lens 4 and the receiving element 3. In addition, a first concentrated light optical axis converting mirror 9a, which has an opening 15 provided in a center thereof, is fixed in place inside the casing 53 while being positioned on the optical axis or in the receiving area of the receiving lens 4 in such a manner that the opening 15 is positioned on the optical axis of the laser beam emitter 2 in a position lying forwards of the laser beam emitter 2 and in such a manner as to form an inclination angle of 45 degrees relative to the optical axes of the receiving lens 4 and the receiving element 3 which are converted in the direction at right angles thereto by the second concentrated light optical axis converting mirror 9b.

By this configuration, when a laser beam emitted from the laser beam emitter 2 is shone to a distance measurement target object by passing through the opening 15 in the first concentrated light optical axis converting mirror 9a and reflected light from the distance measurement target object is guided to the receiving lens 4 via the first concentrated light optical axis converting mirror 9a and the second concentrated light optical axis converting mirror 9b, since the optical axes of the receiving lens 4 and the receiving element 3 are converted by the first and second concentrated light optical axis converting mirrors 9a, 9b, the optical axis of the receiving lens 4 and the optical axis of the emitted laser beam are aligned with each other, or the receiving area of the receiving lens 4 is positioned in the optical axis position of the emitted laser beam.

In this way, by providing the concentrated light optical axis converting mirror 9 in the distance measuring system 1, since the optical axes of the receiving lens 4 and the receiving element 3 can be aligned with the optical axis of the emitted laser beam, or the receiving area of the receiving lens 4 can be positioned in the optical axis position of the emitted laser beam, even though the distance to the distance measurement target object is changed, the position where the reflected light from the distance measurement target object is concentrated does not change so that the reflected light continues to be concentrated into the center of the receiving element 3, and therefore, the adjustment of the mechanism is facilitated.

In addition, since the distance measurement can be implemented accurately over a wide measuring range from far distance to near distance without using the compensating reflecting mirror, the compensating receiving lens or the receiving element having a specially shaped receiving plane which was used in the conventional light measuring system, the assembly and fabrication of the distance measuring system 1 is facilitated and an increase in production costs attributed to parts and assembly and fabrication of the distance measuring system 1 can be suppressed. Furthermore, the production costs of the projector 10 including the distance measuring system 1 can also be suppressed.

Additionally, since the opening 15 in the concentrated light optical axis converting mirror 9 which constitutes a portion where the reflected light from the distance measurement target object is not reflected to the receiving lens 4 can be formed smaller than the area which interrupts the incidence of reflected light on the receiving lens 4 when the laser beam emitter 2 is disposed on the optical axis of the receiving lens 4 in the position lying forwards of the receiving lens 4 as has been described before, an area on the receiving lens 4 where the reflected light is received can be made large, whereby the reception of reflected light from the distance measurement target object by the receiving element 3 can be ensured. In addition, since the reflected light is guided to the receiving lens 4 via the concentrated light optical axis converting mirror 9, the degree of freedom in arranging the constituent components is increased, thereby making it possible to make the projector 10 smaller in size.

In addition, a cylindrical shielding barrel 56 which allows the emitted laser beam to pass therethrough is preferably installed in the opening 15 in the concentrated light optical axis converting mirror 9 or the first concentrated light optical axis converting mirror 9a in such a manner as to prevent the direct incidence on the receiving lens 4 of the reflected light resulting when the laser beam emitted from the laser beam emitter 2 is reflected at the portion where the opening 15 of the concentrated light optical axis converting mirror 9 or the opening 15 of the first concentrated light optical axis converting mirror 9a exists and the scattering light of the emitted laser beam.

Next, a distance measuring system 1 for measuring distances to a plurality of points on a distance measurement target object will be described. The measurement of distances to the plurality of points can be enabled by providing a plurality of distance measuring systems 1 like any one of the distance measuring systems 1 described heretofore in the projector 10. However, as is shown in FIG. 6, by disposing an optical element 51 for refracting to change the direction of optical axes of an emitted laser beam, a receiving lens 4 and a receiving element 3 rotatably, it becomes possible to measure distances to the plurality of points by a single distance measuring system 1.

Figure 6:
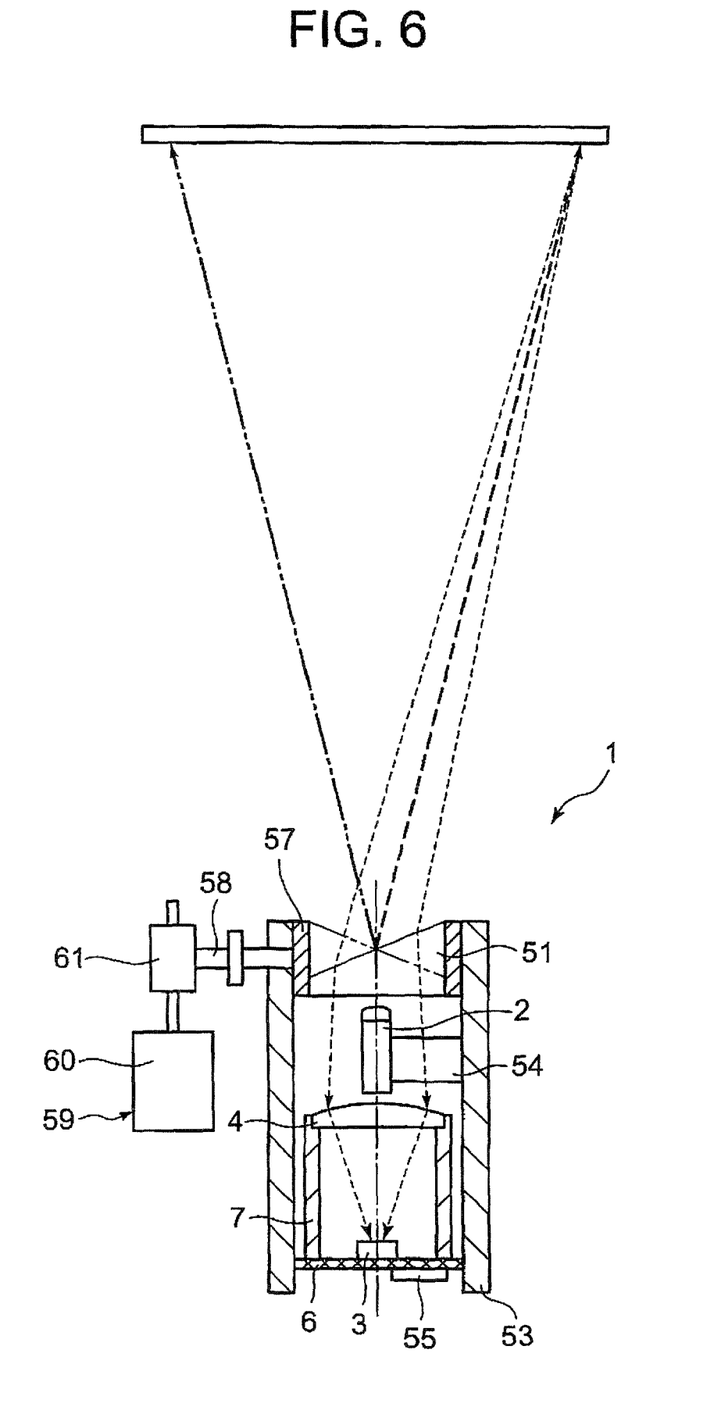
FIG. 6 is a schematic block diagram of a distance measuring system according to an embodiment of the invention which comprises an optical element for refracting to change directions of optical axes of an emitted laser beam, a receiving lens and a receiving element.

A distance measuring system 1 according to an embodiment shown in FIG. 6 is a distance measuring system 1 which is based on the distance measuring system 1 shown in FIG. 3 and which includes the aforesaid optical element 51. In this distance measuring system 1, a rotational barrel 57 which can rotate and which fixes the optical element 51 is held to a casing 53 at a front end of the casing 53, and a rotation control unit 59 for controlling the rotation of the rotational barrel 57 is provided outside the casing 53.

In addition, this optical element 51 is a prism which is formed into a substantially cylindrical shape which results by cutting a cylinder obliquely at one end thereof and is fixed to the rotational barrel 57 by being affixed to an inside thereof.

Consequently, a laser beam emitted from a laser beam emitter 2 is refracted by the optical element 51 to be shone to the distance measurement target object, and light reflected by the distance measurement target object is guided to the receiving lens 4 via the optical element 51 and is then concentrated into the receiving element 3 by the receiving lens 40.

The rotational barrel 57 is fixed to the optical element 51, and gear teeth are formed on an outer circumferential edge of the rotational barrel 57 in such a manner as to mesh with a rotational support gear 58, which will be described later. Thus, the rotational barrel 57 is disposed rotatably inside the casing 53.

The casing 53 slidably holds the rotational barrel 57 in the vicinity of a front end thereof and includes a through hole through which the rotational support gear 58 passes in a predetermined position thereof.

The rotation control unit 59 includes a distance measuring motor 60, a motor gear 61 attached to a rotational shaft of the distance measuring motor 60 and the rotational support gear 58 which meshes with the motor gear 61. The rotational support gear 58 passes through the through hole in the casing 53 so as to mesh with the gear teeth formed on the outer circumferential edge of the rotational barrel 57, whereby the rotational barrel 57 is rotated.

Consequently, in this distance measuring system 1, when the rotational barrel 57 is caused to rotate by the distance measuring motor 60 of the rotation control unit 59, an optical axis of a laser beam emitted from the laser beam emitter 2 and the optical axes of the receiving lens 4 and the receiving element 3 are made to change at all times, so that a position where the laser beam emitted from the laser beam emitter 2 is shone on a screen placed at right angles to the optical axis of the laser beam emitter 2 forms a locus which draws a circle centered at the optical axis of the later beam emitter 2 on the screen so set.

Consequently, by measuring a distance several times while the rotational barrel 57 rotates once, distances to a plurality of different points on a screen from the distance measuring system 1, that is, the projector 10 can be measured.

By this configuration, the distance measurement from far distance to near distance can be implemented, and the distances to the plurality of points on the screen can be measured by the single receiving element 3 and the single laser beam emitter 2. Although focusing can be implemented by measuring a distance to a single point on the screen, in the event that distances to at least three points on the screen are measured, an inclination of the screen can be calculated, and therefore, a distortion correction such as a keystone distortion correction can be implemented.

In addition, in the event that the distance calculating part 45 and the inclination angle calculating part 46 are provided in the projector control unit, the projector 10 which can project a beautiful full-color image can be provided as with the embodiments that have been described before.

In addition, since the measurement of distances to the plurality of points can be realized by installing the single distance measuring system 1 in which the optical element 51 for refracting to change the direction of the optical axes of the emitted laser beam, the receiving lens 4 and the receiving element 3 is disposed rotatably, the projector 10 is not enlarged in size in any case. In addition, although the same advantage can be obtained by moving the distance measuring system 1 itself to measure distances to the plurality of points without installing the optical element 51, by providing the optical element 51, the necessity is preferably obviated of adding a mechanism for moving the distance measuring system 1.

In addition, while as the reflected light concentrating mechanism, the convex lens is disposed in front of the receiving element 3, the invention is not limited to the configuration, and hence, a reflected light concentrating mechanism may be formed in which an inner surface of a receiving lens barrel 7 is formed into a reflecting surface made up of a paraboloidal plane or ellipsoidal plane, and a receiving element 3 is disposed in the vicinity of a focal point position of the paraboloidal plane or ellipsoidal plane.

Furthermore, the invention is not limited to the embodiments that have been described heretofore and hence can be modified or improved variously without departing from the spirit and scope of the invention.

What is claimed is:

1. A distance measuring system comprising:
   a laser beam emitter which emits a laser beam to a distance measurement target object;
   a concentrating element which concentrates reflected light from the distance measurement target object;
   a receiving element which receives the reflected light from the distance measurement target object via the light concentrating unit; and
   a rotatably disposed optical element which refracts light passing therethrough to change directions of optical axes of the emitted laser beam, the receiving element, and the concentrating element;
   wherein an optical axis position of the laser beam emitted from the laser beam emitter is located within a receiving area of the concentrating element.

2. A distance measuring system as set forth in claim 1, wherein the optical axes of the concentrating element and the receiving element are made to align with the optical axis of the laser beam emitted from the laser beam emitter.

3. A distance measuring system as set forth in claim 1, wherein the laser beam emitter is disposed at least one of on the optical axis of the concentrating element and within the receiving area of the concentrating element.

4. A distance measuring system as set forth in claim 1, wherein a reflecting mirror is disposed on one of the optical axis and the receiving area of the concentrating element, and
   wherein the reflecting mirror reflects the laser beam emitted from the laser beam emitter so as to at least one of align the optical axis of the emitted laser beam with the optical axes of the concentrating element and the receiving element, and position the optical axis of the emitted laser beam within the receiving area of the concentrating element.

5. A distance measuring system as set forth in claim 4, further comprising a shielding barrel which allows the emitted laser beam to pass therethrough from the laser beam emitter to the reflecting mirror.

6. A distance measuring system as set forth in claim 1, further comprising a concentrated light optical axis converting mirror which reflects light from the distance measurement target object,
   wherein the concentrated light optical axis converting mirror is disposed at least one of on the optical axes of the concentrating element and the receiving element, and within the receiving area of the concentrating element
   wherein the concentrated light optical axis converting mirror includes an opening through which the emitted laser beam can pass.

7. A distance measuring system as set forth in claim 6, wherein a shielding barrel through which the emitted laser beam can pass is provided in the opening.

8. A projector comprising:
   a light source unit;
   a display device;
   a light source-side optical system which guides light from the light source unit to the display device;
   a projection-side optical system which projects an image emitted from the display device onto a screen; and
   the distance measuring system set forth in claim 1, the projector having a projector control unit which controls the light source unit and the display device,
   wherein the projector control unit comprises a distance calculating part which calculates a distance to the distance measurement target.

9. A projector comprising:
   a light source unit;
   a display device;
   a light source-side optical system which guides light from the light source unit to the display device;
   a projection-side optical system which projects an image emitted from the display device onto a screen; and
   the distance measuring system set forth in claim 1, the projector having a projector control unit which controls the light source unit and the display device,
   wherein the projector control unit comprises:
      a distance calculating part which calculates distances to a plurality of points on the screen and a mean distance;
      an inclination angle calculating part which calculates an inclination angle of the screen based on the distances to the plurality of points on the screen calculated by the distance calculating part; and
      a distortion correcting part which prepares image data for a projecting image which is corrected with respect to distortion based on outputs from the distance calculating part and the inclination angle calculating part.

10. A projector comprising:
    a light source unit;
    a display device;
    a light source-side optical system which guides light from the light source unit to the display device;
    a projection-side optical system which projects an image emitted from the display device onto a screen;
    a projector control unit which controls the light source unit and the display device; and
    the distance measuring system set forth in claim 1, the distance measuring system further comprising a distance calculating part which calculates distances to a plurality of points on the screen,
    wherein the projector control unit comprises:
       an inclination angle calculating part which calculates an inclination angle of the screen based on the distances to the plurality of points on the screen which have been calculated by the distance calculating part; and
       a distortion correcting part which prepares image data for a projecting image which is corrected with respect to distortion based on outputs from the distance calculating part and the inclination angle calculating part.

* * * * *